(12) United States Patent
Bae et al.

(10) Patent No.: US 10,397,513 B2
(45) Date of Patent: Aug. 27, 2019

(54) METHOD FOR DRIVING DISPLAY INCLUDING CURVED DISPLAY AREA, DISPLAY DRIVING CIRCUIT SUPPORTING THE SAME, AND ELECTRONIC DEVICE INCLUDING THE SAME

(71) Applicant: SAMSUNG ELECTRONICS CO., LTD., Suwon-si, Gyeonggi-do (KR)

(72) Inventors: Jong Kon Bae, Seoul (KR); Dong Hwy Kim, Hwaseong-si (KR); Yo Han Lee, Seoul (KR); Hong Kook Lee, Seoul (KR); Dong Kyoon Han, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/689,200

(22) Filed: Aug. 29, 2017

(65) Prior Publication Data
US 2018/0063466 A1    Mar. 1, 2018

(30) Foreign Application Priority Data
Aug. 29, 2016    (KR) .................. 10-2016-0110320

(51) Int. Cl.
*G09G 3/36*    (2006.01)
*H04N 5/66*    (2006.01)
(Continued)

(52) U.S. Cl.
CPC ........... *H04N 5/66* (2013.01); *G02F 1/13306* (2013.01); *G06F 3/147* (2013.01); *G09G 3/2018* (2013.01);
(Continued)

(58) Field of Classification Search
CPC ........ G09G 3/364; G09G 3/3607; G09G 3/36; G09G 3/2018; G09G 3/2092; H04N 5/66;
(Continued)

(56) References Cited

U.S. PATENT DOCUMENTS

| 8,059,169 B2 | 11/2011 | Noh |
| 8,674,904 B2 | 3/2014 | Taguchi et al. |

(Continued)

FOREIGN PATENT DOCUMENTS

| KR | 10-2007-0113035 | 11/2007 |
| KR | 10-2011-0130177 | 12/2011 |
| KR | 10-2015-0003582 | 1/2015 |
| KR | 10-2016-0101295 | 8/2016 |

OTHER PUBLICATIONS

Search Report and Written Opinion dated Dec. 5, 2017 in counterpart International Patent Application No. PCT/KR2017/009448.

*Primary Examiner* — Adam J Snyder
(74) *Attorney, Agent, or Firm* — Nixon & Vanderhye P.C.

(57) ABSTRACT

An electronic device is provided, The electronic device may include a display, a processor operatively connected to the display and configured to generate display data to be output on the display, a display driver integrated circuit configured to output, on the display, the display data received from the processor, wherein the display driver integrated circuit is configured to apply a color transformation value of the same or different magnitude to display data based on a distance from a specified point of the display to a location where the display data are to be displayed.

15 Claims, 12 Drawing Sheets

(51) Int. Cl.

| | | |
|---|---|---|
| *G02F 1/133* | (2006.01) | |
| *G09G 3/20* | (2006.01) | |
| *H04N 21/414* | (2011.01) | |
| *H04N 21/426* | (2011.01) | |
| *H04N 21/431* | (2011.01) | |
| *G06F 3/147* | (2006.01) | |

(52) U.S. Cl.
CPC ............. *G09G 3/2092* (2013.01); *G09G 3/36* (2013.01); *G09G 3/3607* (2013.01); *H04N 21/41407* (2013.01); *H04N 21/42653* (2013.01); *H04N 21/4318* (2013.01); *G09G 2310/0232* (2013.01); *G09G 2370/08* (2013.01)

(58) Field of Classification Search
CPC ....... H04N 21/41407; H04N 21/42653; H04N 21/4318; G02F 1/13306
USPC .......................................................... 345/88
See application file for complete search history.

(56) References Cited

U.S. PATENT DOCUMENTS

| | | | |
|---|---|---|---|
| 2007/0120869 A1* | 5/2007 | Nishida | G09G 3/3607 345/611 |
| 2009/0128670 A1* | 5/2009 | Noh | H04N 1/58 348/241 |
| 2009/0195481 A1 | 5/2009 | Noh | |
| 2009/0309813 A1* | 12/2009 | Fujita | G02F 1/133512 345/55 |
| 2010/0149204 A1* | 6/2010 | Han | G09G 5/02 345/589 |
| 2010/0315734 A1* | 12/2010 | Wu | G02B 5/201 359/891 |
| 2011/0043533 A1* | 2/2011 | Han | G09G 5/02 345/589 |
| 2015/0002531 A1 | 1/2015 | Park et al. | |
| 2016/0027366 A1* | 1/2016 | Nakanishi | G09G 3/2003 345/694 |
| 2016/0239131 A1 | 8/2016 | Kang | |

\* cited by examiner

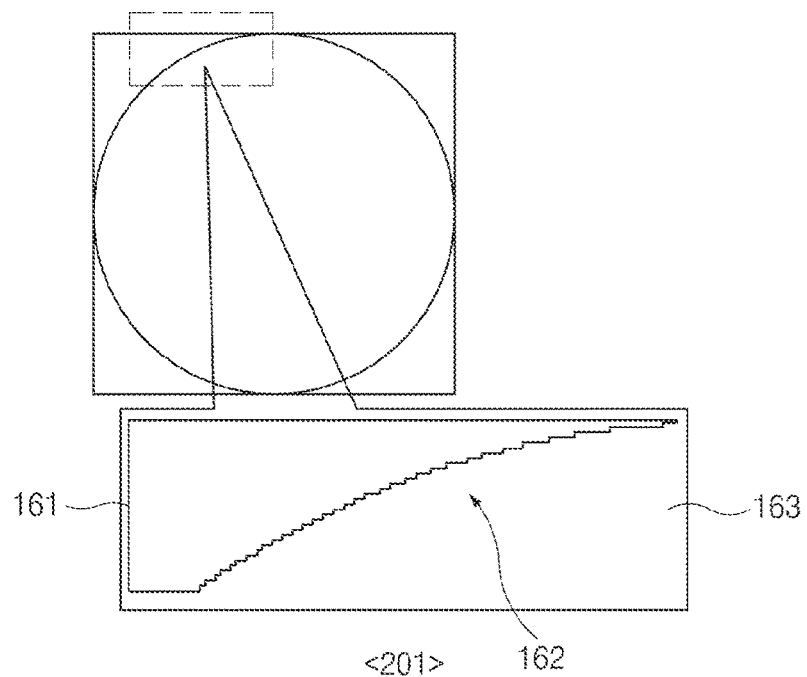
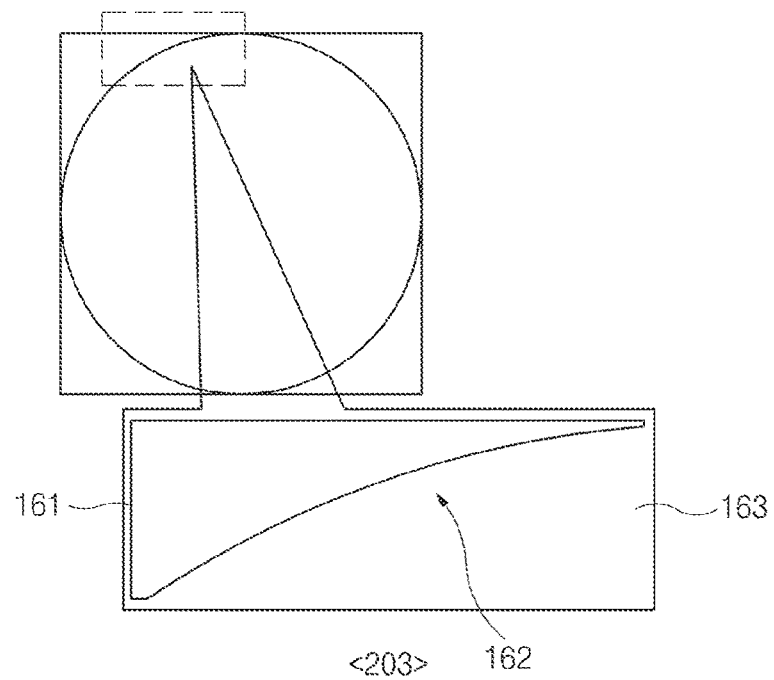
FIG.2

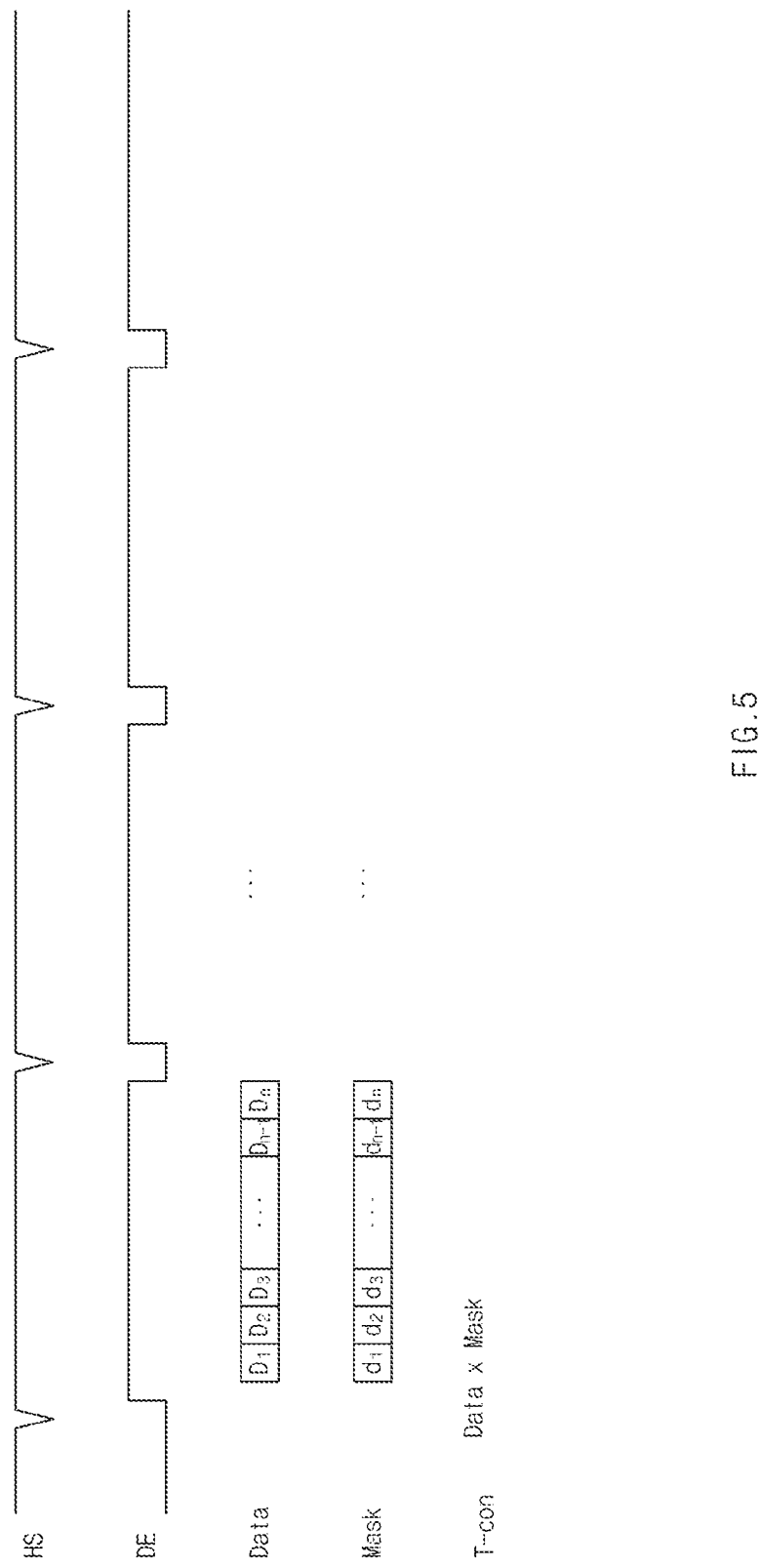

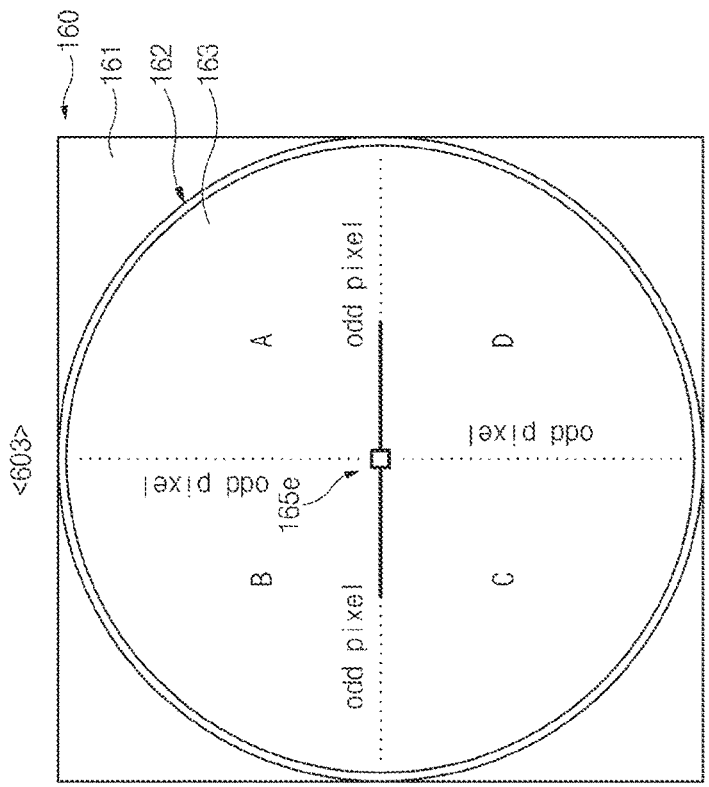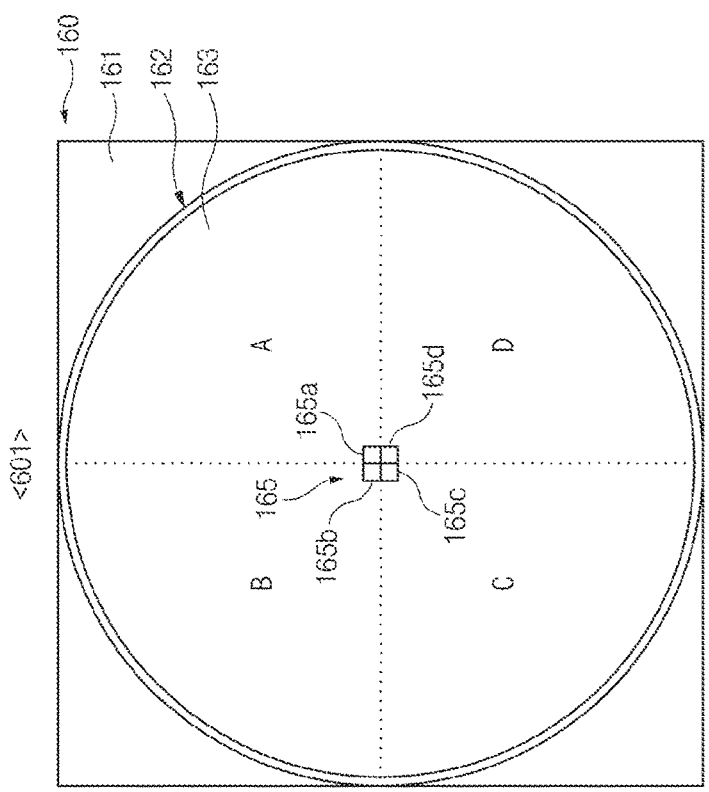
FIG.6

METHOD FOR DRIVING DISPLAY INCLUDING CURVED DISPLAY AREA, DISPLAY DRIVING CIRCUIT SUPPORTING THE SAME, AND ELECTRONIC DEVICE INCLUDING THE SAME

CROSS-REFERENCE TO RELATED APPLICATION

This application is based on and claims priority under 35 U.S.C. § 119 to a Korean patent application filed on Aug. 29, 2016 in the Korean Intellectual Property Office and assigned Serial number 10-2016-0110320, the disclosure of which is incorporated by reference herein in its entirety.

TECHNICAL FIELD

The present disclosure relates generally to driving a display including a curved display area.

BACKGROUND

A conventional electronic device may include a display and may provide a user with various screens visually through the display. The display includes a display panel and a display driver integrated circuit for driving the display panel. The display driver integrated circuit mounted on the electronic device may be supplied with display data from a processor and may drive the display panel based on the display data.

In conventional electronic devices, at least a partial area of a display area of a display may include a curved display area, such as a circular shape, an oval shape, or the like, in addition to a rectangular shape. Since elements (e.g., pixels) of the display are provided in a matrix form, content displayed through the curved display area may be relatively unnatural compared with an area adjacent to the curved display area.

SUMMARY

Example aspects of the present disclosure address at least the above-mentioned problems and/or disadvantages and provide at least the advantages described below. Accordingly, an example aspect of the present disclosure is to provide a curved display driving method capable of expressing a curved display area more naturally, a display driver integrated circuit supporting the same, and an electronic device including the same.

In accordance with an example aspect of the present disclosure, an electronic device is provided. The electronic device may include a display, a processor operatively connected to the display and configured to generate display data to be output on the display, a display driver integrated circuit configured to output, on the display, the display data received from the processor, wherein the display driver integrated circuit is configured to apply a color transformation value of the same or different magnitude as the display data based on a distance from a specified point of the display to a location where the display data are to be displayed.

In accordance with another example aspect of the present disclosure, a method for driving a display is provided. The method may include obtaining a value of a location of a display area at which display data are to be output, determining a distance between the location value and a specified point of the display, determining a color transformation value to be applied to the display data based on the determined distance, applying the determined color transformation value to the display data and outputting the display data, to which the color transformation value is applied, on the display.

In accordance with another example aspect of the present disclosure, a display driver integrated circuit is provided. The display driver integrated circuit may include a receiver interface comprising circuitry configured to receive display data from a processor, a memory configured to store the display data, a mask processing unit comprising processing circuitry configured to obtain information of a location of a display area at which the display data stored in the memory are to be output, to determine a color transformation value to be applied to the display data based on a distance between a specified point and the location, and to output the display data to which the color transformation value is applied, and a display timing controller configured to output the display data on a display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 2 is a diagram illustrating a periphery of the curved display area according to an example embodiment of the present disclosure;

FIG. 5 is a diagram illustrating example driving of a display driver integrated circuit according to an example embodiment of the present disclosure;

FIG. 6 is a diagram illustrating an example of calculation of a central point according to an example embodiment of the present disclosure;

Throughout the drawings, it should be noted that like reference numbers are used to depict the same or similar elements, features, and structures.

DETAILED DESCRIPTION

Figure 1:
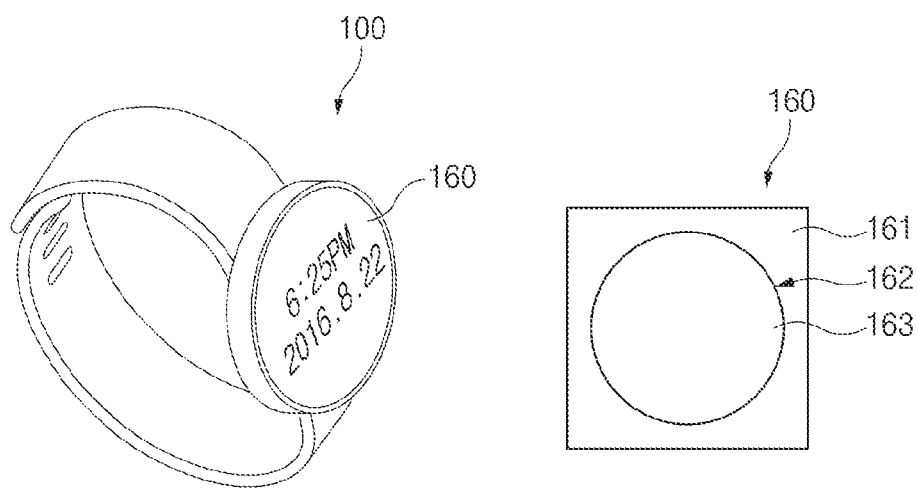
FIG. 1 is a diagram illustrating an example of an electronic device including a curved display area according to an example embodiment of the present disclosure.

Various example embodiments of the present disclosure may be described with reference to accompanying drawings. Accordingly, those of ordinary skill in the art will recognize that modifications, equivalents, and/or alternatives of the various example embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used interchangeably with, for example, the expression "suitable for", "having the capacity to", "designed to", "adapted to", "made to", or "capable of". The term "configured to" does not refer only to "specifically designed to" in hardware. Instead, the expression "a device configured to" may refer to a situation in which the device is "capable of" operating together with another device or other components. For example, a "processor configured to perform A, B, and C" may refer, for example, and without limitation, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various example embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, or the like but is not limited thereto.

According to another example embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like, but are not limited thereto.

According to another example embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like but is not limited thereto.

According to another example embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but are not limited thereto. In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various example embodiments may be described with reference to the accompanying drawings. The term "user" used herein may refer to a person who uses an electronic device or may refer to a device (e.g., an artificial intelligence electronic device) that uses an electronic device.

FIG. 1 is a diagram illustrating an example of an electronic device including a curved display area according to an example embodiment of the present disclosure, and FIG. 2 is a diagram illustrating a periphery of the curved display area according to an example embodiment of the present disclosure.

Referring to FIG. 1, an electronic device 100 according to an embodiment of the present disclosure may include a display 160 and may output display data depending on operating a specified function. In addition, the electronic device 100 may further include a processor that performs signal processing associated with driving the display 160 and a display driver integrated circuit that drives the display 160. The display driver integrated circuit of the electronic device 100 according to an embodiment of the present disclosure may perform signal processing associated with outputting display data in a curved area 163, a blank area 161, and a boundary area 162 of the display 160. According to an embodiment, the display driver integrated circuit may calculate (determine) a color transformation value in the boundary area 162 in real time to allow a color display state in the boundary area 162 to become smoother and more natural while display data is being output.

The display 160 may include, for example, a curved display area. According to an embodiment, the display 160 may be manufactured to have almost a circular shape. Alternatively, as illustrated in FIG. 1, the display 160 may be manufactured in a rectangular shape, and at least part of the display area may form a curve. In this regard, the display 160 may include the blank area 161, the curved area 163, and the boundary area 162.

The curved area 163 may include an area in which there is displayed a screen associated with operating a function of the electronic device 100. The blank area 161 may include the remaining area of the entire area of the display 160 other than the curved area 163 and the boundary area 162. In the case where the display 160 is disposed under, for example, a housing of a circular shape, as illustrated in FIG. 1, the curved area 163 may be exposed through an opening area of the housing, and the blank area 161 may be covered by the housing. Since the blank area 161 is covered by the housing, the blank area 161 may have a screen state corresponding to a specified state (e.g., a turn-off state or a black screen) without displaying information.

According to an example embodiment, the curved area 163 may include an area to which a specified first color transformation value (e.g., a maximum value of alpha blending) may be applied. In the case where the maximum value of the alpha blending is applied to the area, a color to be displayed in the area may be displayed without transformation. For example, the blank area 161 may include an area to which a specified second color transformation value (e.g., a minimum value of alpha blending) may be applied. As the minimum value of the alpha blending is applied to the area, a screen (e.g., a black screen) of a specified color may be displayed in the blank area 161 regardless of a color of display data to be displayed. Alternatively, the maximum value of the alpha blending may be applied to the blank area 161 such that an original image (e.g., a black screen) of display data is displayed.

Referring to FIG. 2, the boundary area 162 may be disposed on a boundary between the blank area 161 and the curved area 163. As pixels are arranged in a matrix form, as in state 201, a color may be displayed in a shape, such as stairs, in the boundary area 162 of a curved shape.

Referring to state 203, according to an example embodiment of the present disclosure, the boundary area 162 may be disposed between the curved area 163 and the blank area 161 with a specific width. A color transformation value (e.g., an alpha blending value) of the boundary area 162 may gradually vary toward the blank area 161 from the curved area 163. For example, a color transformation value of the boundary area 162 close (or adjacent) to the curved area 163 may have a relatively small value (or a value that is determined such that an original color (color of original data) is displayed), and a color transformation value of the boundary area 162 close (or adjacent) to the blank area 161 may have a relatively large value (or a value that is distorted such that a specified color is displayed). With the above description, since a color variation of the boundary area 162 is differently made (e.g., gradually larger) toward the blank area 161 from the curved area 163, the boundary area 162 may be perceived in a smoother and more natural curve shape.

Figure 3A:
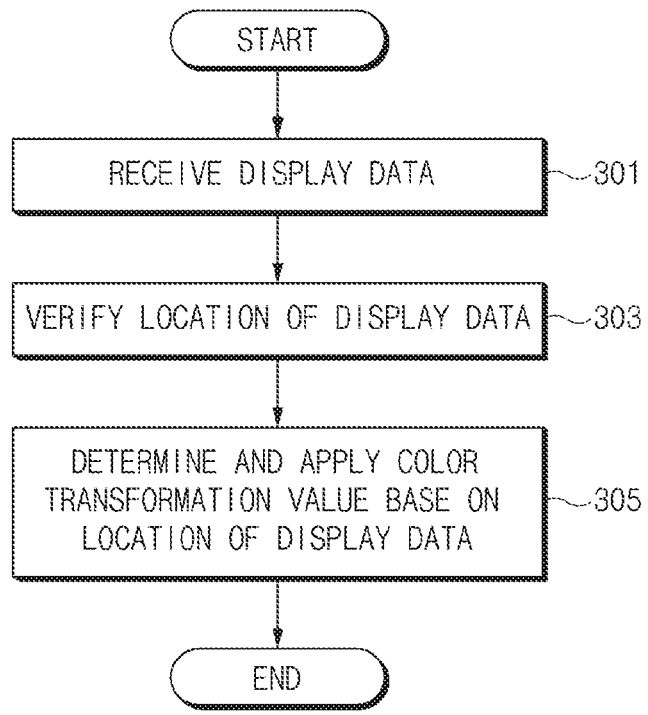
FIG. 3A is a flowchart illustrating an example of a curved display driving method according to an example embodiment of the present disclosure.

FIG. 3A is a flowchart illustrating an example of a curved display driving method according to an example embodiment of the present disclosure.

Referring to FIG. 3A, with regard to the curved display driving method according to an embodiment of the present disclosure, in operation 301, the display driver integrated circuit of the electronic device 100 may receive display data. For example, the display driver integrated circuit may receive display data to be output on the display 160 from a processor (e.g., an application processor). If receiving the display data, the display driver integrated circuit may store the received display data in a memory, may perform image processing on the display data stored in the memory, and may supply the processed display data to the display 160.

In operation 303, the display driver integrated circuit may verify a location of the display data. For example, the display driver integrated circuit may verify a location of the display 160, at which the display data are output. A value of the location of the display data may be determined in advance by an order of display data to be supplied to a source driver of the display 160. In operation 305, the display driver integrated circuit may calculate (determine) a color transformation value corresponding to the location of the display data based on the location of the display data and may apply the calculated (determined) color transformation value to the display data. The display driver integrated circuit may verify a location value of display data displayed on the display 160 with respect to all received display data and may calculate and apply a specified color transformation value for each verified location value. For example, in the case where a location of the display 160, at which display data are to be displayed, is included in the curved area 163, the display driver integrated circuit may apply the specified first color transformation value (e.g., an alpha blending value that does not cause color distortion, or reduces color distortion) to the display data and may transfer the display data, to which the specified first color transformation value is applied, to the display 160 (e.g., a source driver). In the case where a location of the display 160, at which display data are to be displayed, is included in the blank area 161, the display driver integrated circuit may calculate and apply the specified second color transformation value (e.g., an alpha blending value that is determined such that a black screen is displayed) to the display data.

With the above-described operations, the display driver integrated circuit of the electronic device 100 may express a display state in the boundary area 162 more smoothly and more naturally upon displaying a screen including the curved area 163.

Figure 3B:
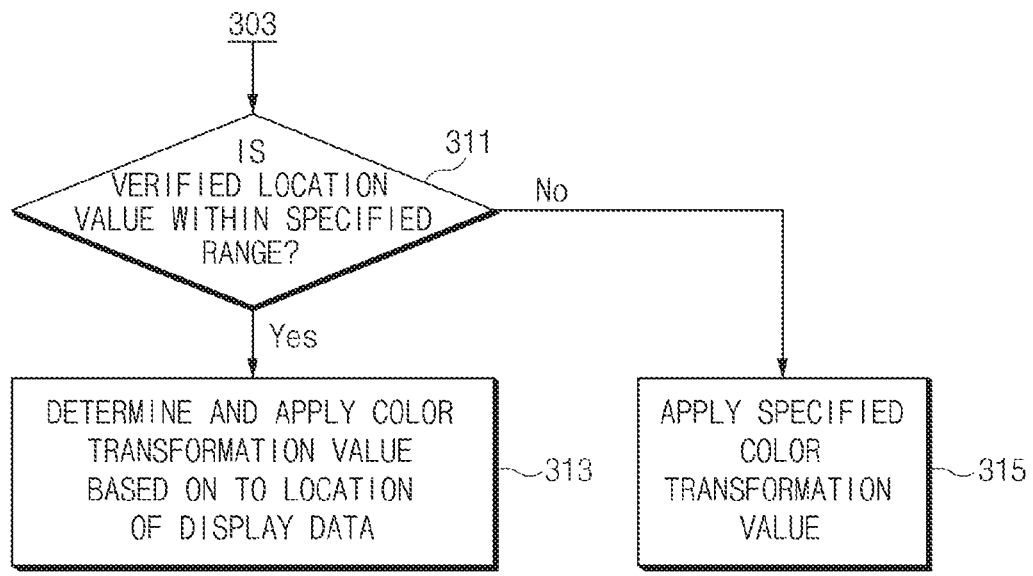
FIG. 3B is a flowchart illustrating another example of the curved display driving method according to an example embodiment of the present disclosure.

FIG. 3B is a flowchart illustrating another example of a curved display driving method according to an example embodiment of the present disclosure.

Referring to FIG. 3B, with regard to the curved display driving method according to an embodiment of the present disclosure, if the display driver integrated circuit of the electronic device 100 receives display data as in operation 301, the display driver integrated circuit may verify a location of the display 160, at which display data are to be output, in operation 311. For example, the display driver integrated circuit may determine whether the verified location value is within a specified or predetermined range. A value of the location of the display 160, at which the display data are to be displayed, may be determined by an order of the display data.

With regard to verifying the location of the display data, in operation 311, the display driver integrated circuit of the electronic device 100 may verify whether the verified location value is within a specified range. In this regard, the display driver integrated circuit may store and manage information about the specified range. In the display driver integrated circuit, the information about the specified range may be changed based on a user input or may be changed based on the intention of a designer associated with manufacturing the electronic device 100. For example, the size of the curved area 163, the size of the blank area 161, and the size of the boundary area 162 may be changed. In this case, the information about the specified range may be updated.

If the verified location value is within the specified range, in operation 313, the display driver integrated circuit of the electronic device 100 may calculate (determine) a color transformation value corresponding to the location of the display data and may apply the calculated (determined) color transformation value to the display data. In this operation, if the verified location value of the display data is within the specified range, the display driver integrated circuit may apply a color transformation value that gradually increases based on a distance from a specified point (e.g., a central point) of the curved area 163. In this regard, the display driver integrated circuit of the electronic device 100 may calculate (determine) a distance from the specific point (e.g., a central point) of the display 160 to a point corresponding to coordinates of the display data for each display data. The display driver integrated circuit may compare a value of the calculated (determined) distance and the specified range and may differently determine a color transformation value to be applied, depending on whether the distance value corresponds to any point of the specified range.

If the verified location value of the display data is out of the specified range, in operation 315, the display driver integrated circuit of the electronic device 100 may apply a specified color transformation value to the display data. For example, the specified range may include a value that is more than a first distance and less than a second distance in a direction from the central point of the display to a periphery thereof. In the case where a distance from the central point of the display 160 to coordinates at which the display data are to be displayed is not more than the first distance, the display driver integrated circuit may apply the first color transformation value (e.g., a value that does not cause (or reduce) distortion of display data, e.g., a maximum alpha blending value) to the display data. In the case where the distance from the central point of the display 160 to the coordinates at which the display data are to be displayed is not less than the second distance, the display driver integrated circuit may apply the second color transformation value (e.g., a value that is determined such that a specified color is displayed: a minimum alpha blending value) to the display data. Alternatively, the display driver integrated circuit may apply the maximum alpha blending value to an area exceeding the second distance such that original display data (e.g., black data) are output without distortion.

With the above description, the display driver integrated circuit of the electronic device 100 may gradually vary a color from the curved area 163 to the blank area 161, thereby making it possible to experience color variation more smoothly and more naturally.

Figure 4A:
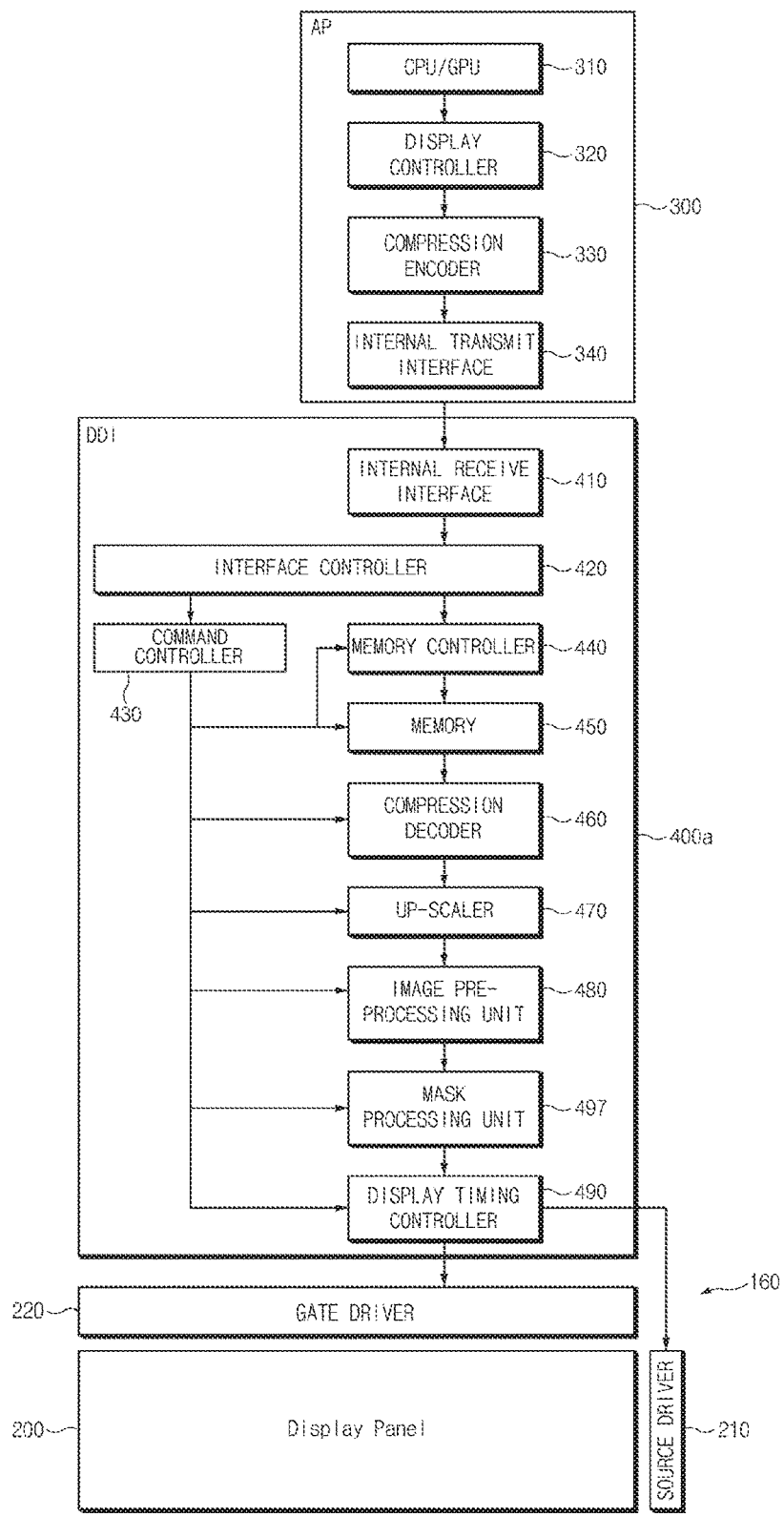
FIG. 4A is a block diagram illustrating an example of a portion of a configuration of an example electronic device associated with driving a display, according to an example embodiment of the present disclosure.

FIG. 4A is a block diagram illustrating an example of a portion of a configuration of the electronic device which is associated with driving a display, according to an example embodiment of the present disclosure.

Referring to FIG. 4A, a configuration associated with driving a display of the present disclosure may include a processor (e.g., including processing circuitry) 300 (e.g., an application processor, a communication processor, a sensor hub, or the like), a display driver integrated circuit (DDI) 400a, and the display 160.

The processor 300 may include various processing circuitry and generate display data according to various embodiments and may provide the generated display data to the display driver integrated circuit 400a. For example, the processor 300 may encode or compress display data in a specified manner and may provide the encoded or compressed display data to the display driver integrated circuit 400a. The processor 300 may enter a sleep state (a state where a display is turned off), for example, in response to a user manipulation or depending on scheduling set in advance. When the processor 300 is in the sleep state, the display driver integrated circuit 400a may output at least part of display data stored in a memory to the display 160 depending on a specified operation manner.

The above-described processor 300 may include various processing circuitry, such as, for example, and without limitation, a central processing unit (CPU)/graphics processing unit (GPU) 310, a display controller 320, a compression encoder 330, and an internal transmit interface 340 (e.g., MIPI Tx).

The CPU/GPU 310 may process data to be output on the display 160 in response to scheduled information or a user input. The CPU/GPU 310 may transfer the processed data to the display controller 320.

The display controller 320 may generate display data to be transferred to the display driver integrated circuit 400a based on data that the CPU/GPU 310 transfers.

The compression encoder 330 may encode display data generated in the display controller 320 in a specified manner (e.g., a display stream compression (DSC) manner defined in VESA). Accordingly, the display data generated in the display controller 320 may be compressed such that the amount of display data decreases. For example, the magnitude of display data generated in the display controller 320 may decrease to 1/n by the encoding of the compression encoder 330. According to various embodiments, a configuration or an operation of the compression encoder 330 may be omitted. In other words, display data may be transferred to the display driver integrated circuit 400a without a compression process.

The internal transmit interface 340 may transfer the display data encoded by the compression encoder 330 to the display driver integrated circuit 400a. The internal transmit interface 340 may include, for example, a mobile industry processor interface (MIPI).

The display driver integrated circuit 400a may calculate (determine) a color transformation value of display data and may output the display data on a display panel 200 after applying the color transformation value to the display data. For example, if receiving display data from the processor 300, the display driver integrated circuit 400a may calculate (determine) a color transformation value to be applied to the display data based on a value of a location at which the display data are to be output and may output the display data on the display 160 after applying the calculated (determined) color transformation value to the display data.

The above-described display driver integrated circuit 400a may include various circuitry including, for example, and without limitation, an internal receive interface 410 (or receiver interface)(e.g., MIPI Rx), an interface controller 420, a command controller 430, a memory controller 440, a memory 450 (e.g., a graphics RAM (GRAM)), a compression decoder 460, an up-scaler 470, an image pre-processing unit 480, a mask processing unit 497, and a display timing controller 490. Although not illustrated in FIG. 4A, according to various embodiments, the display driver integrated circuit 400a may further include an oscillator, a module to adjust the number of frames (or a frame frequency), a module to apply pixel power, or the like.

The internal receive interface 410 may communicate with the processor 300 to receive control information and display data from the processor 300. The internal receive interface 410 may include, for example, and without limitation, an MIPI receiver circuit. If the internal receive interface 410 receives control information and display data through the MIPI transmit circuit of the processor 300, the internal receive interface 410 may transfer the control information and the display data to the interface controller 420.

The interface controller 420 may receive display data and/or control information from the processor 300. The interface controller 420 may transfer the received display data to the memory controller 440. The interface controller 420 may transfer the received control information to the command controller 430.

The memory controller 440 may write the display data received from the interface controller 420 in the memory 450. For example, the memory controller 440 may write display data from the processor 300 in the memory 450 depending on a frame rate of the display data.

The memory 450 may include a graphics RAM (GRAM). The memory 450 may store display data that the memory controller 440 transfers. The stored display data may include data that are compressed by the processor 300 or are not compressed. The memory 450 may include a memory space corresponding to a resolution and/or the number of color gradations of the display panel 200. The memory 450 may include at least one of a frame buffer or a line buffer. The number of times that the memory 450 is updated or an update speed of the memory 450 may vary with a type of an image to be output on the display panel 200. For example, when a video is played, the memory 450 may store display data corresponding to a frame of the video at a specified speed. In the case of a still image, the memory 450 may store a previous still image until an image is updated. The display data stored in the memory 450 may include a coordinate value of each display area of the display 160 or an order of display data may correspond to coordinates to be displayed on the display 160.

The command controller 430 may control the display timing controller 490 such that display data stored in the memory 450 are output to a specified area of the display panel 200 after the corresponding color transformation value is applied to the display data. The command controller 430 may include various circuitry and be referred to as "control logic".

In the case where at least part of display data read from the memory 450 is encoded, the compression decoder 460 may decode the at least part of the read display data in a specified manner and may transfer the decoded data to the display timing controller 490. For example, if the magnitude of display data is compressed to 1/n by the compression encoder 330 of the processor 300, the compression decoder 460 may decompress the at least partial display data to display data before compression.

The up-scaler 470 and/or the image pre-processing unit 480 may be disposed between the compression decoder 460 and the display timing controller 490. According to various embodiments, in the case where at least partial display data selected by the command controller 430 is not encoded, a configuration of the compression decoder 460 may not be performed or may be bypassed.

The up-scaler 470 may include various circuitry to enlarge the decompressed image at a specified magnification. According to an embodiment, the up-scaler 470 may enlarge display data to be output on the display panel 200 in the case where there is a need to enlarge the display data depending on the magnitude of the display data or user settings. The up-scaler 470 may transfer the display data enlarged by the up-scaler 470 to the display timing controller 490. In the case where there is no need to enlarge at least part of the display data, a configuration of the up-scaler 470 may not be performed or may be bypassed.

The image pre-processing unit 480 may improve the image quality of display data. The image pre-processing unit 480 may include, for example, and without limitation, a pixel data processing circuit, a pre-processing circuit, a gating circuit, or the like.

The mask processing unit 497 may include various circuitry to process the blank area 161 and the boundary area 162 of the display 160. For example, the mask processing unit 497 may calculate a specified color transformation value (e.g., a value that is determined such that a black screen is displayed) to be applied to display data to be output to the blank area 161 and may apply the calculated color transformation value to the blank area 161. Alternatively, the mask processing unit 497 may provide the calculated color transformation value to the display timing controller 490 such that the display timing controller 490 applies the color transformation value to display data.

According to various embodiments, the mask processing unit 497 may be configured to output specified display data (e.g., a data value that is determined such that a black screen is output) in the blank area 161. In this case, the mask processing unit 497 may calculate a color transformation value (e.g., a maximum alpha blending value) for outputting an original color screen of display data to be output in the blank area 161 and may apply the calculated color transformation value to the display data. In the case where the maximum alpha blending value is applied to display data, an original color may be reproduced without transformation or distortion of a color that the display data indicates.

The mask processing unit 497 may calculate and apply a color transformation value associated with the boundary area 162. In this regard, the mask processing unit 497 may obtain information about a point corresponding to a central point of the boundary area 162. Returning to FIG. 2, the mask processing unit 497 may obtain information about the central point of the boundary area 162 of the display 160 and may calculate a distance from the central point to a location where display data are displayed. The mask processing unit 497 may calculate a specified color transformation value depending on the calculated distance. For example, the mask processing unit 497 may calculate a distance from the central point with respect to display data based on the following equation 1.

$$(x-a)^2 + y-b^2 = D \quad \text{[Equation 1]}$$

Here, "x" and "y" are center coordinate values of a circle, and "a" and "b" may include values of two-dimensional coordinates at which display data are to be output. "D" may include a value indicating a distance from the central point of the display 160 to display data. The mask processing unit 497 may allocate a specified color transformation value depending on a value of "D". As such, the mask processing unit 497 may calculate a color transformation value of display data associated with each pixel of the display 160. With regard to allocating the color transformation value, the mask processing unit 497 may include an arithmetic device that is able to process specified arithmetic expression. For example, the mask processing unit 497 may include an operator that is configured to calculate a color transformation value such that the color transformation value becomes smaller as a distance from the central point decreases (or "D" decreases) (or a value that is determined such that a color approximate to an original display data color is displayed, e.g., a maximum alpha blending value) and a color transformation value becomes greater as a distance from the central point increases (or "D" increases) (or a value that is determined such that a specified color corresponding to distortion of an original color of display data is displayed, e.g., a minimum alpha blending value). The arithmetic device of the mask processing unit 497 may be configured to process an integer operation. In this regard, the mask processing unit 497 may calculate a color transformation value with respect to the distance "D" from the central point by truncating values after decimal point and using only integer values.

According to various example embodiments, the mask processing unit 497 may calculate and apply a color transformation value based on the following equation 2.

$$D1 < x-a^a + y-b^2 < D2 \quad \text{[Equation 2]}$$

Here, "x" and "y" are center coordinate values of a circle, and "a" and "b" may include values of two-dimensional coordinates at which display data are to be output. D1 may refer, for example, to a specified first distance value from the central point, and D2 may refer, for example, to a specified second distance value from the central point. The D2 may be greater than the D1 in value. The mask processing unit 497 may calculate a color transformation value corresponding to a distance, with respect to display data placed between a specified first distance point and a specified second distance point with respect to the central point based on the equation 2. Here, the first distance point may be spaced apart from the central point by the first distance, and the second distance point may be spaced apart from the central point by the second distance. For example, the mask processing unit 497 may apply a relatively small color transformation value (e.g., a value determined such that colors of display data close (or adjacent) to the curved area 163 are slightly distorted) to display data approximate to the first distance point. The mask processing unit 497 may apply a relatively great color transformation value (e.g., a value determined such that colors of display data close to the blank area 161 are relatively greatly distorted) to display data approximate to the second distance point. The mask processing unit 497 may apply a specified color transformation value (e.g., a value determined such that an original color of display data is expressed) to display data placed within the first distance or to display data exceeding the second distance. An embodiment is above exemplified as the mask processing unit 497 is disposed between the image pre-processing unit 480 and the display timing controller 490. However, embodiments of the present disclosure may not be limited thereto. For example, the mask processing unit 497 may be disposed between two elements selected from the compression decoder 460, the up-scaler 470, and the image pre-processing unit 480.

The display timing controller 490 may control timing of elements included in the display driver integrated circuit 400a. For example, the display timing controller 490 may adjust timing when display data received from the processor 300 are stored in the memory 450 and timing when display data stored in the memory 450 are read, so as not to be overlapped. The display timing controller 490 may control timing when display data stored in the memory 450 are transferred to the compression decoder 460 and the up-scaler 470 after being read at a specified frame rate under control of the command controller 430.

The display timing controller 490 may transfer display data received from the image pre-processing unit 480 to a source driver 210 under control of the command controller 430 and may control an output of a gate signal of a gate driver 220. According to an embodiment, the display timing controller 490 may be implemented in the command controller 430. The display timing controller 490 may convert display data received from the memory 450 through the compression decoder 460, the up-scaler 470, and/or the image pre-processing unit 480 into an image signal and may supply the image signal to the source driver 210 and the gate driver 220 of the display panel 200. In the case where the mask processing unit 497 is configured to calculate a color transformation value, the display timing controller 490 may apply the color transformation value provided from the mask processing unit 497 to display data. For example, the display timing controller 490 may output display data after applying a color transformation value, which is calculated depending on a distance from the central point to a specific pixel, to the display data.

The display 160 may include the source driver 210, the gate driver 220, and the display panel 200. In addition, the display 160 may further include a touch panel, a touch IC, a pressure sensor, a pressure sensor IC, a digitizer, and the like, which are associated with a user input.

The display panel 200 may display various information (e.g., multimedia data, text data, or the like). The display panel 200 may include, for example, and without limitation, a liquid-crystal display (LCD) panel, an active-matrix organic light-emitting diode (AM-OLED) panel, or the like. For example, the display panel 200 may be implemented to be flexible, transparent, or wearable. Also, the display panel 200 may be included in, for example, a cover of a case electrically coupled to the electronic device 100.

The display panel 200 may be supplied with an image signal corresponding to display data from the display driver integrated circuit 400a to display a screen corresponding to the display data. In the display panel 200, a plurality of data lines and a plurality of gate lines may cross each other, and a plurality of pixels may be disposed at intersections of the data lines and the gate lines. In the case where the display panel 200 corresponds to an OLED panel, each of the plurality of pixels may include at least one or more switching elements (e.g., FET) and one OLED. Each pixel may produce light based on an image signal received from the display driver integrated circuit 400 at specified timing. The display panel 200 may have, for example, a resolution of wide quad high definition (WQHD) (2560×1440).

The source driver 210 and the gate driver 220 may generate signals to be supplied to a scan line and a data line (not illustrated) of the display panel 200, based on a source control signal and a gate control signal received from the display timing controller 490, respectively.

Figure 4B:
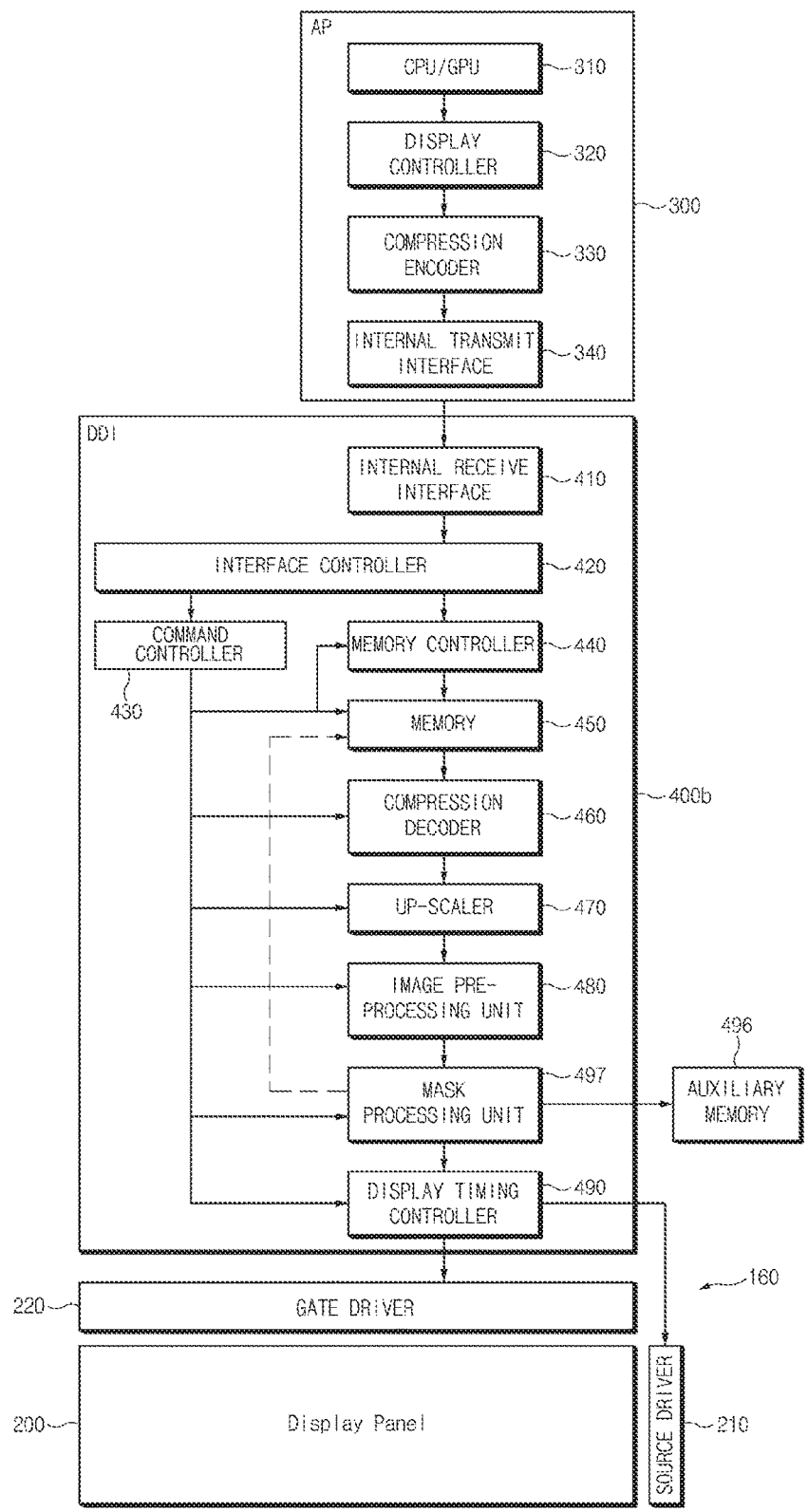
FIG. 4B is a block diagram illustrating another example of a portion of a configuration of the example electronic device according to an example embodiment of the present disclosure.

FIG. 4B is a block diagram illustrating another example of a portion of a configuration of the electronic device according to an example embodiment of the present disclosure.

Referring to FIG. 4B, an electronic device may include the processor 300, the display driver integrated circuit 400b, and the display 160. The processor 300 and the display 160 of the electronic device may be configured to be substantially the same as or similar to the processor 300 and the display 160 described with reference to FIG. 4A.

The display driver integrated circuit 400b may include the internal receive interface 410 (or internal receiver interface), the interface controller 420, the command controller 430, the memory controller 440, the memory 450, the compression decoder 460, the up-scaler 470, the image pre-processing unit 480, the mask processing unit 497, an auxiliary memory 496, and the display timing controller 490.

The auxiliary memory 496 may store a color transformation value (e.g., an alpha blending value or a masking image) to be applied to a boundary area of a curved shape. The masking image may include an image that is composed of color transformation values to be applied to at least one area of, for example, a curved area, a boundary area, and a blank area. The auxiliary memory 496 may store various color transformation values depending on a shape of the curved area 163 of the display 160. For example, as described with reference to FIG. 2, in the case where the display 160 includes the boundary area 162 of a circular shape, the auxiliary memory 496 may respectively store a color transformation value associated with the boundary area 162 and a color transformation value associated with the curved area 163 and the blank area 161.

The mask processing unit 497 may obtain a color transformation value from the auxiliary memory 496. The mask processing unit 497 may apply the color transformation value to display data that the image pre-processing unit 480 transfers and may transfer the display data, to which the color transformation value is applied, to the display timing controller 490. In the case where the mask processing unit 497 is disposed in front of the image pre-processing unit 480, the mask processing unit 497 may read a color transformation value from the auxiliary memory 496 and may apply the read color transformation value to scaled display data that the up-scaler 470 transfers.

An example embodiment is above exemplified as the mask processing unit 497 is independent of the display timing controller 490. However, embodiments of the present disclosure may not be limited thereto. For example, the mask processing unit 497 may be included in the display timing controller 490. Alternatively, the display timing controller 490 may replace a function of the mask processing unit 497. In the case where the display timing controller 490 replaces a function of the mask processing unit 497, the mask processing unit 497 may be removed.

According to various example embodiments, the display driver integrated circuit 400b may store color transformation values to be applied to a curved area in the memory 450. In this case, the auxiliary memory 496 may be removed from the display driver integrated circuit 400b, and the mask processing unit 497 may be implemented to access the memory 450 (e.g., circuit wirings are added).

FIG. 5 is a diagram illustrating example driving of a display driver integrated circuit according to an example embodiment of the present disclosure.

Referring to FIG. 5, the display driver integrated circuit 400a or 400b (below, the reference numeral 400a is referenced to describe a display driver integrated circuit, but it will be understood that the disclosure is not limited thereto) may maintain a turn-on state of a data enable (DE) signal during one period of a horizontal sync (HS) signal. The DE signal may maintain the turn-on state for each period of the HS signal.

Display data "Data" may be supplied during each period of the HS signal while the DE signal maintains the turn-on state. The HS signal may have a turn-on period corresponding to the number of gate lines during a vertical sync (VS) signal. In this case, the DE signal may have a turn-on state corresponding to the number of gate lines. When D1, D2, D3, . . . , Dn−1, and Dn are supplied as the display data "Data" as illustrated in FIG. 5, the mask processing unit 497 may calculate color transformation values "Mask" d1, d2, d3, . . . , dn−1, and dn, associated with the display data D1, D2, D3, . . . , Dn−1, and Dn, respectively. The display timing controller 490 may apply the color transformation values d1, d2, d3, . . . , dn−1, and dn to the display data D1, D2, D3, . . . , Dn−1, and Dn and may output the display data, to which the color transformation values d1, d2, d3, . . . , dn−1, and dn are applied, on the display 160. The calculating and applying of the color transformation values d1, d2, d3, . . . , dn−1, and an may be performed in the mask processing unit 497, and the display timing controller 490 may allow the source driver 210 and the gate driver 220 to be driven in synchronization with data.

FIG. 6 is a diagram illustrating an example of calculation of a central point according to an example embodiment of the present disclosure.

Referring to FIG. 6, as illustrated in state 601, the display driver integrated circuit 400a of the electronic device 100 according to an embodiment of the present disclosure may select "N" pixels (e.g., N being 1, 2, 3, 4, etc.; below, "N" is assumed as being "4" for ease of explanation, but it will be understood that the disclosure is not limited thereto) specified at a central point and may calculate a color transformation value based on the selected pixels. For example, in the case where the display 160 is covered by a housing as illustrated in FIG. 6 or is displayed in a circular (or oval) shape, the display driver integrated circuit 400a may be configured such that four pixels placed at the center of the display 160 are used as a central point. The display driver integrated circuit 400a may calculate a distance in each quadrant based on the four pixels. For example, the display driver integrated circuit 400a may select a first central point 165a with regard to measuring a distance of display data in the first quadrant "A". As in the above description, the display driver integrated circuit 400a may select a second central point 165b with regard to measuring a distance of display data in the second quadrant "B", may select a third central point 165c with regard to measuring a distance of display data in the third quadrant "C", and may select a fourth central point 165d with regard to measuring a distance of display data in the fourth quadrant "D".

The display driver integrated circuit 400a may calculate a color transformation value based on a distance between each of the central points 165a, 165b, 165c, and 165d and display data in the corresponding quadrant. If a color transformation value is calculated, the display driver integrated circuit 400a may configure a screen by applying a color transformation value for each pixel to display data. In this operation, as described above, the display driver integrated circuit 400a may apply a specified distance range to the boundary area 162 and may apply a color transformation value of a different magnitude to display data in proportion to a distance (or distance range).

According to various embodiments, as illustrated in state 603, the display driver integrated circuit 400a may calculate a distance between a central point 165e and each pixel and may calculate a color transformation value based on the calculated distance. In this case, the display driver integrated circuit 400a may calculate a distance between the central point 165e and each pixel disposed at a peripheral end of a screen and belonging to an odd-numbered distance (a distance from the central point 165e to a pixel at a periphery of a display is the odd-numbered distance). In a distance calculation process, the display driver integrated circuit 400a may perform an integer operation (or an operation using the remaining values while values after decimal point are truncated). In calculating distances based on the four central points 165a, 165b, 165c, and 165d, the display driver integrated circuit 400a may calculate a distance between each central point and each pixel belonging to an even-numbered distance (a distance from each of the central points 165a, 165b, 165c, and 165d to each peripheral pixel of the corresponding quadrant of a display is the even-numbered distance).

Figure 7:
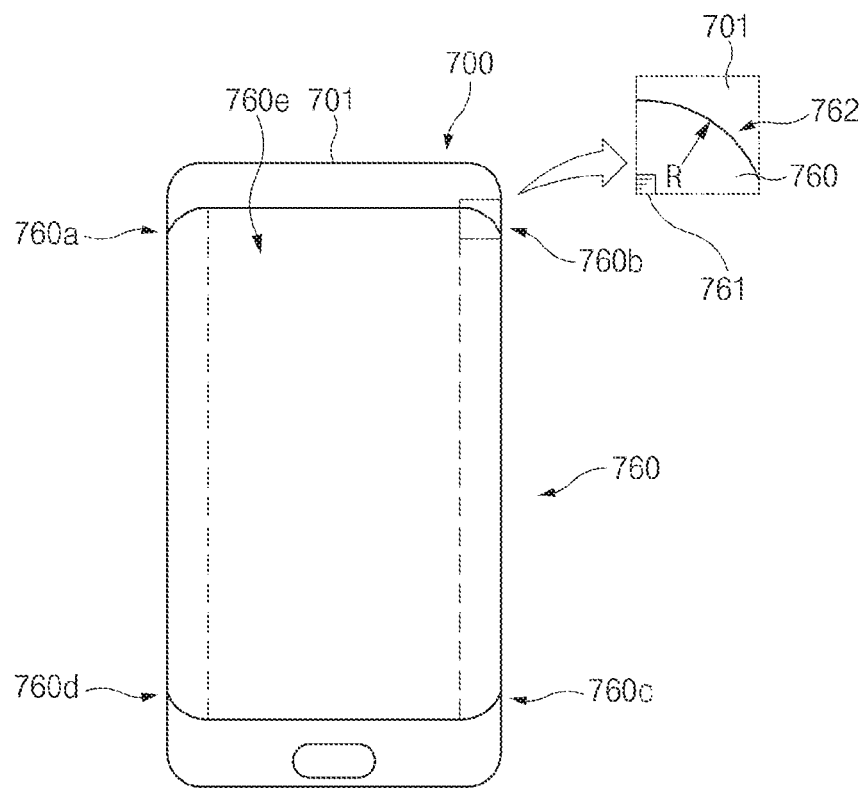
FIG. 7 is a diagram illustrating another example of an electronic device to which a display driving method is applied, according to an example embodiment of the present disclosure.

FIG. 7 is a diagram illustrating another example of an electronic device to which a display driving method according to an example embodiment of the present disclosure is applied.

Referring to FIG. 7, an electronic device 700 according to an embodiment of the present disclosure may include a display 760 and a housing 701. An upper side of the housing 701 may be opened such that at least a partial area of the display 760 is exposed to the outside. The display 760 may be disposed in the opened portion of the housing 701. A main printed circuit board, a battery, and the like may be seated inside the housing 701, and a processor, a memory, and the like, which are associated with driving the display 760, may be mounted on the main printed circuit board.

The display 760 may include, for example, curved areas 760a, 760b, 760c, and 760d in one or more corner areas and a flat area 760e. For example, the flat area 760e may be disposed on the center of the display 760, and the curved areas 760a, 760b, 760c, and 760d may be disposed such that a display area is curved in a peripheral direction of at least one of left and right sides of the flat area 760e while being continuous with the flat area 760e. Each of the curved areas 760a, 760b, 760c, and 760d may include an above-described boundary area 762. The boundary area 762 may have a specified curvature "R". A specified color transformation value may be applied to at least one boundary area of the boundary areas of the curved areas 760a, 760b, 760c, and 760d. According to an embodiment, a color transformation value that increases as an outward distance from the center of a display area increases may be applied to the boundary area of the first curved area 760a. A color transformation value (e.g., an alpha blending value) associated with the boundary area of the first curved area 760a may be stored in the auxiliary memory 496 described above with reference to FIG. 4B, for example. In this case, upon processing display data of the first curved area 760a, the display driver integrated circuit 400a may verify a color transformation value stored in the auxiliary memory 496 and may process color transformation of display data to be displayed in a boundary area with respect to the first curved area 760a. The display driver integrated circuit 400a may store color transformation values associated with the boundary areas of the curved areas 760a, 760b, 760c, and 760d in the auxiliary memory 496.

The auxiliary memory 496 may store only color transformation values, which correspond to some curved areas, from among the color transformation values associated with the boundary areas of the curved areas 760a, 760b, 760c, and 760d. According to an embodiment, the display driver integrated circuit 400a may apply a color transformation value corresponding to the boundary area of the first curved area 760a to the boundary areas of the second curved area 760b, the third boundary area 760c, and the fourth boundary area 760d. In the case where color transformation values associated with two color boundary areas are used, the display driver integrated circuit 400a may change a color transformation value stored in the auxiliary memory 496 depending on bilateral symmetry and may apply the changed color transformation value to display data associated with the boundary area of each curved area. In this regard, the display driver integrated circuit 400a may store only a color transformation value associated with the boundary area of the curved area 760a in the auxiliary memory 496. A color transformation value to be stored to the auxiliary memory 496 may include, for example, color transformation values (e.g., alpha blending values) to be applied depending on a distance from a central point (e.g., 761) of each curved area to each pixel disposed in each curved area.

As described above, with regard to a display having a curved area as illustrated in FIG. 7, the display driver integrated circuit 400a may display a screen by defining the center 761 as a central point of specified coordinates (e.g., a rectangular (Cartesian) coordinate system) as in a circular display and drawing a curve depending on an "R" value (curvature value). The above-described center 761 may be identically applied to the curved areas 760a, 760b, 760c, and 760d.

An embodiment is exemplified in FIGS. 2 and 6 as a boundary area is processed on the basis of a circular display area. However, embodiments of the present disclosure may not be limited thereto. For example, and without limitation, the circular shape may include an oval shape having eccentricity of a specified magnitude.

According to various example embodiments, the electronic device may include a display, a processor operatively connected to the display and configured to generate display data to be output on the display, a display driver integrated circuit configured to output, on the display, the display data received from the processor, wherein the display driver integrated circuit is configured to apply a color transformation value having a same or different magnitude to display data based on a distance from a specified point of the display to a location where the display data are to be displayed.

According to various example embodiments, the display driver integrated circuit is configured to apply color transformation values of different magnitudes to pieces of display data to be displayed on a display area from a first distance point spaced apart from the specified point to a second distance point.

According to various example embodiments, the display driver integrated circuit is configured to apply, to pieces of display data to be displayed on a display area, which is closer to the first distance point of the display area between the first distance point to the second distance point, color transformation values that are determined to allow colors of the pieces of display data to be similar to original colors of the pieces of display data.

According to various example embodiments, the display driver integrated circuit is configured to apply, to pieces of display data to be displayed on a display area, which is closer to the second distance point of the display area between the first distance point to the second distance point, color transformation values determined to allow the pieces of display data are displayed with a specified color.

According to various example embodiments, the display driver integrated circuit is configured to apply color transformation values, having magnitudes that gradually increase, to the pieces of display data to be displayed on the display area from the first distance point to the second distance point.

According to various example embodiments, the display driver integrated circuit is configured to display a screen in which the display area includes a blank area configured such that specified display data are displayed, a curved area configured such that display data based on execution of an application are displayed, and a boundary area including a curve between the blank area and the curved area.

According to various example embodiments, the display driver integrated circuit is configured to output a screen including a curved area having a circular shape in which display data based on execution of an application are displayed, a blank area surrounding the curved area and in which a black screen is displayed, and a boundary area between the blank area and the curved area.

According to various example embodiments, the display driver integrated circuit is configured to apply, to display data, a color transformation value that gradually increases in the boundary area from the curved area toward the blank area.

According to various example embodiments, the display driver integrated circuit is configured to apply the same first color transformation value to pieces of display data to be displayed on a display area within a first distance from the specified point.

According to various example embodiments, the display driver integrated circuit is configured to apply a value to the pieces of display data, is the value being determined such that original colors of the pieces of display data to be displayed on the display area within the first distance from the specified point are displayed.

According to various example embodiments, the display driver integrated circuit is configured to apply the same second color transformation value to pieces of display data to be displayed on a display area outside of a specified second distance from the specified point, wherein the second distance is greater than the first distance.

According to various example embodiments, the display driver integrated circuit is configured to apply a value to the pieces of display data, is the value being determined such that the pieces of display data to be displayed on the display area outside of the second distance from the specified point are displayed with a specified color, wherein the second distance is greater than the first distance.

According to various example embodiments, the display driver integrated circuit is configured to apply a value to the pieces of display data, the value being determined such that the pieces of display data to be displayed on the display area outside of the second distance from the specified point are displayed with a black screen, wherein the second distance is greater than the first distance.

According to various example embodiments, the display driver integrated circuit is configured to determine the first color transformation value and the second color transformation value to display pieces of display data to be displayed in a specified display area with the same color.

According to various example embodiments, the electronic device may further include an auxiliary memory configured to store the color transformation value.

According to various example embodiments, a method may include obtaining a value of a location of a display area, at which display data are to be output, determining a distance between the location value and a specified point of the display, determining a color transformation value to be applied to the display data based on the determined distance, applying the determined color transformation value to the display data and outputting the display data, to which the color transformation value is applied, on the display.

According to various example embodiments, the applying may include at least one of: applying the same first color transformation value to display data to be output on a display area between the specified point and a first point, applying the same second color transformation value to display data to be output on a display area outside of a second point that is more distant from the specified point than the first point and applying a color transformation value, a magnitude of which varies based on a distance from the specified point, to display data to be output on a display area between the first point and the second point.

According to various example embodiments, the outputting may include outputting a screen including a curved area of a circular shape, which is centered at the specified point, a blank area surrounding the curved area, and a boundary area between the curved area and the blank area.

According to various example embodiments, the display driver integrated circuit may include a receiver interface comprising circuitry configured to receive display data from a processor, a memory configured to store the display data, a mask processing unit comprising circuitry configured to obtain information about a location of a display area, at which the display data stored in the memory are to be output, to determine a color transformation value to be applied to the display data based on a distance between a specified point and the location, and to output the display data, to which the color transformation value is applied and a display timing controller configured to output the display data on a display.

According to various example embodiments, the display driver integrated circuit may further include an auxiliary memory configured to store the color transformation value.

Figure 8:
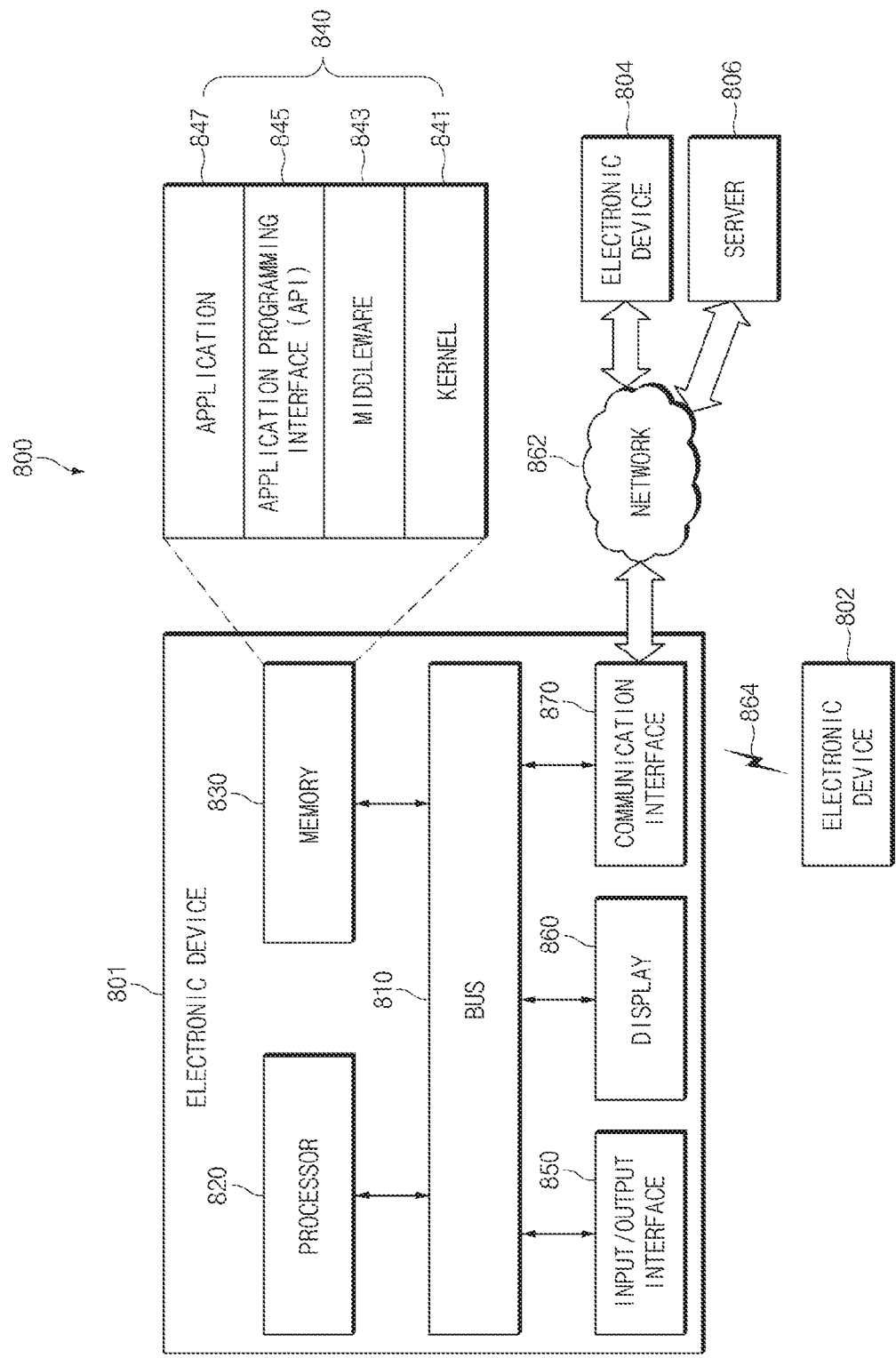
FIG. 8 is a block diagram illustrating an example configuration of an electronic device in a network environment according to an example embodiment.

FIG. 8 is a block diagram illustrating an example configuration of an electronic device in a network environment according to an example embodiment.

Referring to FIG. 8, in various embodiments, an electronic device 801 and a first external electronic device 802, a second external electronic device 804, or a server 806 may connect with each other through a network 862 or local-area communication 864. The electronic device 801 may include a bus 810, a processor (e.g., including processing circuitry) 820, a memory 830, an input/output interface (e.g., including input/output circuitry) 850, a display 860, and a communication interface (e.g., including communication circuitry) 870. In various embodiments, at least one of the components may be omitted from the electronic device 801, or other components may be additionally included in the electronic device 801.

The bus 810 may be, for example, a circuit which connects the components 820 to 870 with each other and transmits a communication signal (e.g., a control message and/or data) between the components.

The processor 820 may include various processing circuitry, such as, for example, and without limitation, one or more of a dedicated processor, a central processing unit (CPU), an application processor (AP), or a communication processor (CP). For example, the processor 820 may perform calculation or data processing about control and/or communication of at least another of the components of the electronic device 801.

The memory 830 may include a volatile and/or non-volatile memory. The memory 830 may store, for example, a command or data associated with at least another of the components of the electronic device 801. According to an embodiment, the memory 830 may store software and/or a program 840. The program 840 may include, for example, a kernel 841, a middleware 843, an application programming interface (API) 845, and/or an least one application program 847 (or "at least one application"), and the like. At least part of the kernel 841, the middleware 843, or the API 845 may be referred to as an operating system (OS).

The kernel 841 may control or manage, for example, system resources (e.g., the bus 810, the processor 820, or the memory 830, and the like) used to execute an operation or function implemented in the other programs (e.g., the middleware 843, the API 845, or the application program 847). Also, as the middleware 843, the API 845, or the application program 847 accesses a separate component of the electronic device 801, the kernel 841 may provide an interface which may control or manage system resources.

The middleware 843 may play a role as, for example, a go-between such that the API 845 or the application program 847 communicates with the kernel 841 to communicate data.

Also, the middleware 843 may process one or more work requests, received from the application program 847, in order of priority. For example, the middleware 843 may assign priority which may use system resources (the bus 810, the processor 820, or the memory 830, and the like) of the electronic device 801 to at least one of the at least one application program 847. For example, the middleware 843 may perform scheduling or load balancing for the one or more work requests by processing the one or more work requests in order of the priority assigned to the at least one of the at least one application program 847.

The API 845 may be, for example, an interface in which the application program 847 controls a function provided from the kernel 841 or the middleware 843. For example, the API 845 may include at least one interface or function (e.g., a command) for file control, window control, image processing, or text control, and the like.

The input/output interface 850 may include various input/output circuitry and play a role as, for example, an interface which may transmit a command or data input from a user or another external device to another component (or other components) of the electronic device 801. Also, input and output interface 850 may output an instruction or data received from another component (or other components) of the electronic device 801 to the user or the other external device.

The display 860 may include, for example, a liquid crystal display (LCD), a light emitting diode (LED) display, an organic LED (OLED) display, a microelectromechanical systems (MEMS) display, or an electronic paper display, or the like, but is not limited thereto. The display 860 may display, for example, a variety of content (e.g., text, images, videos, icons, or symbols, and the like) to the user. The display 860 may include a touch screen, and may receive, for example, touch, gesture, proximity, or a hovering input using an electronic pen or part of a body of the user.

The communication interface 870 may include various communication circuitry and establish communication between, for example, the electronic device 801 and an external device (e.g., a first external electronic device 802, a second external electronic device 804, or a server 806). For example, the communication interface 870 may connect to a network 862 through wireless communication or wired communication and may communicate with the external device (e.g., the second external electronic device 804 or the server 806). Additionally, the communication interface 870 may establish a short-range wireless local connection 864 with an external electronic device, such as, for example, and without limitation, a first electronic device 802.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 864. The local-area communication 864 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 801 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 862 may include a telecommunications network, for example, at least one of a computer network (e.g., a local area network (LAN) or a wide area network (WAN)), the Internet, or a telephone network.

Each of the first and second external electronic devices 802 and 804 may be the same as or different device from the electronic device 801. According to an embodiment, the server 806 may include a group of one or more servers. According to various embodiments, all or some of operations executed in the electronic device 801 may be executed in another electronic device or a plurality of electronic devices (e.g., the first external electronic device 802, the second external electronic device 804, or the server 806). According to an embodiment, if the electronic device 801 should perform any function or service automatically or according to a request, it may request another device (e.g., the first external electronic device 802, the second external electronic device 804, or the server 106) to perform at least part of the function or service, rather than executing the function or service for itself or in addition to the function or service. The other electronic device (e.g., the first external electronic device 802, the second external electronic device 804, or the server 806) may execute the requested function or the added function and may transmit the executed result to the electronic device 801. The electronic device 801 may process the received result without change or additionally and may provide the requested function or service. For this purpose, for example, cloud computing technologies, distributed computing technologies, or client-server computing technologies may be used.

Figure 9:
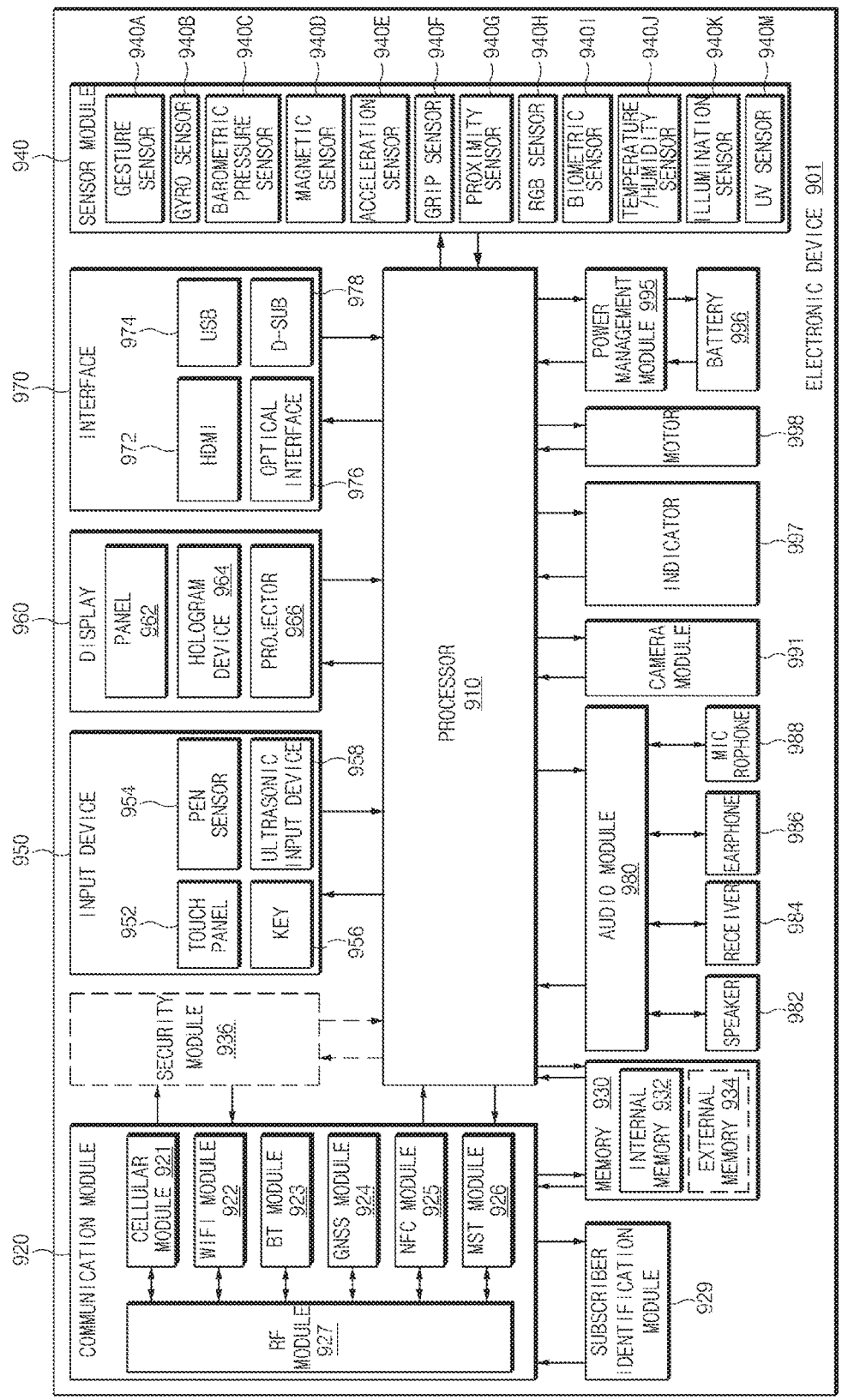
FIG. 9 is a block diagram illustrating an example configuration of an electronic device according to various example embodiments.

FIG. 9 is a block diagram illustrating an example configuration of an electronic device according to various example embodiments.

Referring to FIG. 9, the electronic device 901 may include, for example, all or part of an electronic device 801 illustrated in FIG. 8. The electronic device 901 may include one or more processors (e.g., including processing circuitry) 910 (e.g., application processors (APs)), a communication module (e.g., including communication circuitry) 920, a subscriber identification module (SIM) 929, a memory 930, a security module 936, a sensor module 940, an input device (e.g., including input circuitry) 950, a display 960, an interface (e.g., including interface circuitry) 970, an audio module 980, a camera module 991, a power management module 995, a battery 996, an indicator 997, and a motor 998.

The processor 910 may include various processing circuitry and drive, for example, an operating system (OS) or an application program to control a plurality of hardware or software components connected thereto and may process and compute a variety of data. The processor 910 may be implemented with, for example, a system on chip (SoC). According to an embodiment, the processor 910 may include a graphic processing unit (GPU) (not shown) and/or an image signal processor (not shown). The processor 910 may include at least some (e.g., a cellular module 921) of the components shown in FIG. 9. The processor 910 may load a command or data received from at least one of other components (e.g., a non-volatile memory) into a volatile memory to process the data and may store various data in a non-volatile memory.

The communication module 920 may have the same or similar configuration to a communication interface 1370 of FIG. 8. The communication module 920 may include, various communication circuitry, such as, for example, and without limitation, the cellular module 921, a wireless-fidelity (Wi-Fi) module 922, a Bluetooth (BT) module 923, a global navigation satellite system (GNSS) module 924 (e.g., a GPS module, a Glonass module, a Beidou module, or a Galileo module), a near field communication (NFC) module 925, an MST module 926, and a radio frequency (RF) module 927.

The cellular module 921 may provide, for example, a voice call service, a video call service, a text message service, or an Internet service, and the like through a communication network. According to an embodiment, the cellular module 921 may identify and authenticate the electronic device 901 in a communication network using the SIM 929 (e.g., a SIM card). According to an embodiment, the cellular module 921 may perform at least part of functions which may be provided by the processor 910. According to an embodiment, the cellular module 921 may include a communication processor (CP).

The Wi-Fi module 922, the BT module 923, the GNSS module 924, the NFC module 925, or the MST module 926 may include, for example, a processor for processing data transmitted and received through the corresponding module. According to various embodiments, at least some (e.g., two or more) of the cellular module 921, the Wi-Fi module 922, the BT module 923, the GNSS module 924, the NFC module 925, or the MST module 926 may be included in one integrated chip (IC) or one IC package.

The RF module 927 may transmit and receive, for example, a communication signal (e.g., an RF signal). Though not shown, the RF module 927 may include, for example, a transceiver, a power amplifier module (PAM), a frequency filter, or a low noise amplifier (LNA), or an antenna, and the like. According to another embodiment, at least one of the cellular module 921, the Wi-Fi module 922, the BT module 923, the GNSS module 924, the NFC module 925, or the MST module 926 may transmit and receive an RF signal through a separate RF module.

The SIM 929 may include, for example, a card which includes a SIM and/or an embedded SIM. The SIM 929 may include unique identification information (e.g., an integrated circuit card identifier (ICCID)) or subscriber information (e.g., an international mobile subscriber identity (IMSI)).

The memory 930 (e.g., a memory 830 of FIG. 8) may include, for example, an embedded memory 932 and/or an external memory 934. The embedded memory 932 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 934 may include a flash drive, for example, a compact flash (CF), a secure digital (SD), a micro-SD, a mini-SD, an extreme digital (xD), a multimedia car (MMC), or a memory stick, and the like. The external memory 934 may operatively and/or physically connect with the electronic device 901 through various interfaces.

The security module 936 may be a module which has a relatively higher secure level than the memory 930 and may be a circuit which stores secure data and guarantees a protected execution environment. The security module 936 may be implemented with a separate circuit and may include a separate processor. The security module 936 may include, for example, an embedded secure element (eSE) which is present in a removable smart chip or a removable SD card or is embedded in a fixed chip of the electronic device 901. Also, the security module 936 may be driven by an OS different from the OS of the electronic device 901. For example, the security module 936 may operate based on a Java card open platform (JCOP) OS.

The sensor module 940 may measure, for example, a physical quantity or may detect an operation state of the electronic device 901, and may convert the measured or detected information to an electrical signal. The sensor module 940 may include at least one of, for example, a gesture sensor 940A, a gyro sensor 940B, a barometer (barometric pressure) sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 940 may further include a control circuit for controlling at least one or more sensors included therein. According to various embodiments, the electronic device 901 may further include a processor configured to control the sensor module 940, as part of the processor 910 or to be independent of the processor 910. While the processor 910 is in a sleep state, the electronic device 901 may control the sensor module 940.

The input device 950 may include various input circuitry, such as, for example, and without limitation, a touch panel 952, a (digital) pen sensor 954, a key 956, or an ultrasonic input device 958. The touch panel 952 may use at least one of, for example, a capacitive type, a resistive type, an infrared type, or an ultrasonic type. Also, the touch panel 952 may further include a control circuit. The touch panel 952 may further include a tactile layer and may provide a tactile reaction to a user.

The (digital) pen sensor 954 may be, for example, part of the touch panel 952 or may include a separate sheet for recognition. The key 956 may include, for example, a physical button, an optical key, or a keypad. The ultrasonic input device 958 may allow the electronic device 901 to detect a sound wave using a microphone (e.g., a microphone 988) and to verify data through an input tool generating an ultrasonic signal.

The display 960 (e.g., a display 860 of FIG. 8) may include a panel 962, a hologram device 964, or a projector 966. The panel 962 may include the same or similar configuration to the display 160 or 860. The panel 962 may be implemented to be, for example, flexible, transparent, or wearable. The panel 962 and the touch panel 952 may be integrated into one module. The hologram device 964 may show a stereoscopic image in a space using interference of light. The projector 966 may project light onto a screen to display an image. The screen may be positioned, for example, inside or outside the electronic device 901. According to an embodiment, the display 960 may further include a control circuit for controlling the panel 962, the hologram device 964, or the projector 966.

The interface 970 may include various interface circuitry, such as, for example, and without limitation, a high-definition multimedia interface (HDMI) 972, a universal serial bus (USB) 974, an optical interface 976, or a D-subminiature 978. The interface 970 may be included in, for example, a communication interface 870 shown in FIG. 8. Additionally or alternatively, the interface 970 may include, for example, a mobile high definition link (MHL) interface, an SD card/multimedia card (MMC) interface, or an infrared data association (IrDA) standard interface.

The audio module 980 may convert a sound and an electric signal in dual directions. At least part of components of the audio module 980 may be included in, for example, an input and output interface 850 (or a user interface) shown in FIG. 8. The audio module 980 may process sound information input or output through, for example, a speaker 982, a receiver 984, an earphone 986, or the microphone 988, and the like.

The camera module 991 may be a device which captures a still image and a moving image. According to an embodiment, the camera module 991 may include one or more image sensors (not shown) (e.g., a front sensor or a rear sensor), a lens (not shown), an image signal processor (ISP) (not shown), or a flash (not shown) (e.g., an LED or a xenon lamp).

The power management module 995 may manage, for example, power of the electronic device 901. According to an embodiment, though not shown, the power management module 995 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 901 or part (e.g., the processor 910) thereof, for example, a booting state, a message state, or a charging state, and the like. The motor 998 may convert an electric signal into mechanical vibration and may generate vibration or a haptic effect, and the like. Though not shown, the electronic device 901 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 10:
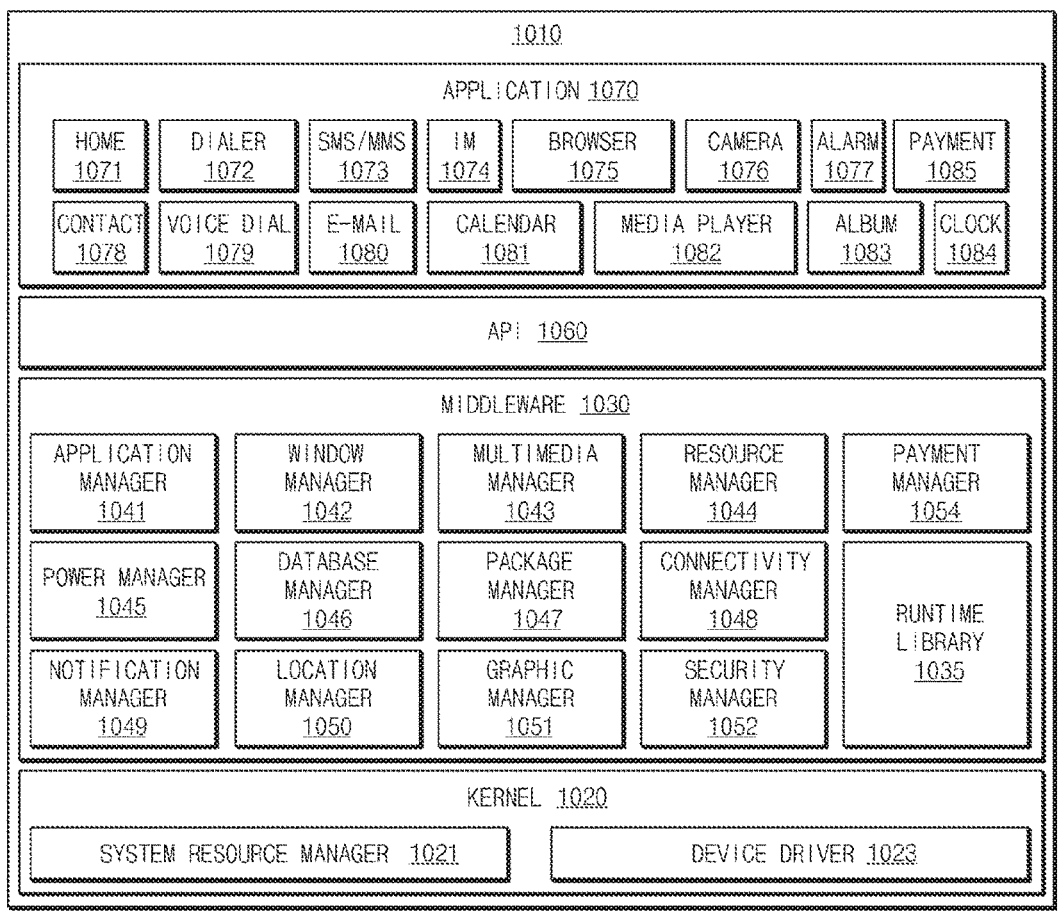
FIG. 10 is a block diagram illustrating an example configuration of a program module according to various example embodiments.

FIG. 10 is a block diagram illustrating an example configuration of a program module according to various example embodiments.

According to an embodiment, the program module 1010 (e.g., a program 840 of FIG. 8) may include an operating system (OS) for controlling resources associated with an electronic device (e.g., an electronic device 801 of FIG. 8) and/or various applications (e.g., an application program 847 of FIG. 8) which are executed on the OS. The OS may be, for example, Android, iOS, Windows, Symbian, Tizen, or Bada, and the like.

The program module 1010 may include a kernel 1020, a middleware 1030, an application programming interface (API) 1060, and/or an application 1070. At least part of the program module 1010 may be preloaded on the electronic device, or may be downloaded from an external electronic device (e.g., a first external electronic device 802, a second external electronic device 804, or a server 806, and the like of FIG. 8).

The kernel 1020 (e.g., a kernel 841 of FIG. 8) may include, for example, a system resource manager 1021 and/or a device driver 1023. The system resource manager 1021 may control, assign, or collect, and the like system resources. According to an embodiment, the system resource manager 1021 may include a process management unit, a memory management unit, or a file system management unit, and the like. The device driver 1023 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1030 (e.g., a middleware 843 of FIG. 8) may provide, for example, functions the application 1070 needs in common, and may provide various functions to the application 1070 through the API 1060 such that the application 1070 efficiently uses limited system resources in the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module used by a compiler to add a new function through a programming language while the application 1070 is executed. The runtime library 1035 may perform a function about input and output management, memory management, or an arithmetic function.

The application manager 1041 may manage, for example, a life cycle of at least one of the application 1070. The window manager 1042 may manage graphic user interface (GUI) resources used on a screen of the electronic device. The multimedia manager 1043 may determine a format utilized for reproducing various media files and may encode or decode a media file using a codec corresponding to the corresponding format. The resource manager 1044 may manage source codes of at least one of the application 1070, and may manage resources of a memory or a storage space, and the like.

The power manager 1045 may act together with, for example, a basic input/output system (BIOS) and the like, may manage a battery or a power source, and may provide power information utilized for an operation of the electronic device. The database manager 1046 may generate, search, or change a database to be used in at least one of the application 1070. The package manager 1047 may manage installation or update of an application distributed by a type of a package file.

The connectivity manager 1048 may manage, for example, wireless connection such as Wi-Fi connection or BT connection, and the like. The notification manager 1049 may display or notify events, such as an arrival message, an appointment, and proximity notification, by a method which is not disturbed to the user. The location manager 1050 may manage location information of the electronic device. The graphic manager 1051 may manage a graphic effect to be provided to the user or a user interface (UI) related to the graphic effect. The security manager 1052 may provide all security functions utilized for system security or user authentication, and the like. According to an embodiment, when the electronic device (e.g., an electronic device 100 or 801 of FIG. 1 or 8) has a phone function, the middleware 1030 may further include a telephony manager (not shown) for managing a voice or video communication function of the electronic device.

The middleware 1030 may include a middleware module which configures combinations of various functions of the above-described components. The middleware 1030 may provide a module which specializes according to kinds of OSs to provide a differentiated function. Also, the middleware 1030 may dynamically delete some of old components or may add new components.

The API 1060 (e.g., an API 845 of FIG. 8) may be, for example, a set of API programming functions, and may be provided with different components according to OSs. For example, in case of Android or iOS, one API set may be provided according to platforms. In case of Tizen, two or more API sets may be provided according to platforms.

The application 1070 (e.g., an application program 847 of FIG. 8) may include one or more of, for example, a home application 1071, a dialer application 1072, a short message service/multimedia message service (SMS/MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, or payment application 1085. Additionally, or alternatively, though not shown, the application 1070 may include a health care application (e.g., an application for measuring quantity of exercise or blood sugar, and the like), or an environment information application (e.g., an application for providing atmospheric pressure information, humidity information, or temperature information, and the like), or the like.

According to an embodiment, the application 1070 may include an application (hereinafter, for better understanding and ease of description, referred to as "information exchange application") for exchanging information between the electronic device (e.g., the electronic device 801 of FIG. 8) and an external electronic device (e.g., the first external electronic device 802 or the second external electronic device 804). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 802 or the second external electronic device 804). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 802 or the second external electronic device 804) which communicates with the electronic device, an application which operates in the external electronic device, or a service (e.g., a call service or a message service) provided from the external electronic device.

According to an embodiment, the application 1070 may include an application (e.g., the health card application of a mobile medical device) which is preset according to attributes of the external electronic device (e.g., the first external electronic device 802 or the second external electronic device 804). According to an embodiment, the application 1070 may include an application received from the external electronic device (e.g., the server 806, the first external electronic device 802, or the second external electronic device 804). According to an embodiment, the application 1070 may include a preloaded application or a third party application which may be downloaded from a server. Names of the components of the program module 1010 according to various embodiments of the present disclosure may differ according to kinds of OSs.

According to various embodiments, at least part of the program module 1010 may be implemented with software, firmware, hardware, or at least two or more combinations thereof. At least part of the program module 1010 may be implemented (e.g., executed) by, for example, a processor (e.g., a processor 820 of FIG. 8). At least part of the program module 1010 may include, for example, a module, a program, a routine, sets of instructions, or a process, and the like for performing one or more functions.

The terminology "module" used herein may refer, for example, to a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include, for example and without limitation, at least one of a dedicated processor, a CPU, an application-specific integrated circuit (ASIC) chip, field-programmable gate arrays (FPGAs), or a programmable-logic device, which is well known or will be developed in the future, for performing certain operations.

According to various example embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various example embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Example embodiments of the present disclosure described and shown in the drawings are provided as examples to describe technical content and help understanding but do not limit the present disclosure. Accordingly, it should be understood that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include various processing circuitry, such as, for example, and without limitation, a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

According to various example embodiments of the present disclosure, an improved screen may be provided by displaying a curve more smoothly.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a processor operatively connected to the display and configured to generate display data to be output on the display;
a display driver integrated circuit configured to output the display data received from the processor,
wherein the display driver integrated circuit is configured to output a screen including:
an image displaying area having at least a partially round shape,
a blank area partially surrounding the image displaying area,
a boundary area disposed between the image displaying area and the blank area,
wherein the image is displayed in the image displaying area according to execution of an application,
a black image, to be generated by the display driver integrated circuit, displayed in the blank area, and
a borderline, to be generated by the display driver integrated circuit, displayed in the boundary area, and
wherein the display driver integrated circuit is further configured to apply a plurality of color transformation values to at least some pixels of the borderline in the boundary area based on a plurality of distances from a specified point in the image displaying area to each of the at least some pixels, in the boundary area, where the color transformation value is applied, so that a color of the borderline becomes darker from the image displaying area toward the blank area based on the plurality of color transformation values.

2. The electronic device of claim 1, wherein the display driver integrated circuit is configured to:
apply color transformation values of different magnitudes to pieces of display data to be displayed on a display area of the display located between a first distance point spaced apart from the specified point to a second distance point spaced apart from the specified point.

3. The electronic device of claim 2, wherein the display driver integrated circuit is configured to:
apply color transformation values to pieces of display data to be displayed on a display area of the display between the first distance point and the second distance point and closer to the first distance point than the second distance point, wherein the color transformation values are determined to provide colors of the pieces of display data similar to original colors of the pieces of display data.

4. The electronic device of claim 2, wherein the display driver integrated circuit is configured to:
apply color transformation values to pieces of display data to be displayed on a display area of the display between the first distance point and the second distance point and closer to the second distance point than the first distance point, wherein the color transformation values are determined to provide the pieces of display data with a specified color to be displayed.

5. The electronic device of claim 2, wherein the display driver integrated circuit is configured to:
apply color transformation values to the pieces of display data to be displayed on the display area, wherein magnitudes of the color transformation values applied to the pieces of display data gradually increase from the first distance point to the second distance point.

6. The electronic device of claim 1, wherein the display driver integrated circuit is configured to:
apply, to display data, a color transformation value that gradually increases in the boundary area toward the blank area from the curved area.

7. The electronic device of claim 1, further comprising:
an auxiliary memory configured to store the color transformation value.

8. The electronic device of claim 1, wherein at least one of corners of the display is rounded corresponding to the partial round shape of the image displaying area.

9. A method for driving a display, the method comprising:
obtaining a value of a location of a display area, at which display data are to be output;
determining a distance between the location value and a specified point of the display;
determining color transformation values to be applied to the display data depending on the determined distance;
outputting a screen including:
an image displaying area having at least a partially round shape,
a blank area partially surrounding the image displaying area,
a boundary area disposed between the image displaying area and the blank area,
wherein the image is displayed in the image displaying area according to execution of an application,
a black image is displayed in the blank area, and
a borderline being displayed in the boundary area;
applying a plurality of color transformation values to the borderline in the boundary area based on a distance from a specified point in the image displaying area to a point, in the boundary area, where the color transformation value is applied, so that a color of the borderline becomes darker from the image displaying area moving toward the blank area based on the plurality of color transformation values; and
outputting the display data, to which the color transformation value is applied, on the display.

10. The method of claim 9, wherein the applying includes at least one of:
applying a same first color transformation value to display data to be output on a display area between the specified point and a first point;
applying a same second color transformation value to display data to be output on a display area outside of a second point that is more distant from the specified point than the first point; and
applying a color transformation value, a magnitude of which varies based on a distance from the specified point, to display data to be output on a display area between the first point and the second point.

11. The method of claim 9, wherein the outputting includes: outputting the image displaying area having at least the partially round shape, which is centered at the specified point.

12. A method for driving a display of claim 9, wherein at least one of corners of the display is rounded corresponding to the partial round shape of the image displaying area.

13. A display driver integrated circuit comprising:
a receiver interface comprising circuitry configured to receive display data from a processor;
a memory configured to store the display data;
a processing unit comprising circuitry configured to output a screen including:
an image displaying area having at least a partially round shape,
a blank area partially surrounding the image displaying area,
a boundary area disposed between the image displaying area and the blank area,
wherein the image to be displayed in the image displaying area is to be according to execution of an application,
a black image to be displayed in the blank area, and
a borderline to be displayed in the boundary area, and
the processing unit further configured to:
obtain information about a location of a display area at which the display data stored in the memory are to be output,
determine a plurality of color transformation values to the borderline in the boundary area based on a distance from a specified point in the image displaying area to a point, in the boundary area, where the color transformation value is applied such that a color of the borderline becomes darker from the image displaying area toward the blank area based on the plurality of color transformations values, and
output the display data, to which the color transformation value is applied; and
a display timing controller configured to output the display data on a display.

14. The display driver integrated circuit of claim 13, further comprising:
an auxiliary memory configured to store the color transformation value.

15. The display driver integrated circuit of claim 13, wherein at least one of corners of the display is rounded corresponding to the partial round shape of the image displaying area.

* * * * *